Feb. 15, 1938.   R. S. BASSETT   2,108,425
WATER METER
Filed Oct. 23, 1937

INVENTOR
Robt. S. Bassett

Patented Feb. 15, 1938

2,108,425

UNITED STATES PATENT OFFICE 2,108,425

WATER METER

Robert S. Bassett, Buffalo, N. Y.

Application October 23, 1937, Serial No. 170,622

2 Claims. (Cl. 73—277)

This invention relates to water meters of the frost-proof type and has for its object the supporting of the inner and more expensive working parts of the meter in the outer surrounding case in such a manner that, as the meter freezes, they, as well as the main outer case, will be relieved from strain and distortion due to the breaking of an inexpensive part, usually the bottom of the outer case.

The objects of my present invention are principally to improve the construction and arrangement of parts in these meters for the purpose of reducing the cost of manufacture, increasing the durability and efficiency and giving other advantageous results.

I will now proceed to definitely describe the manner in which I have carried out my invention and then claim what I believe to be novel.

Figure 1:
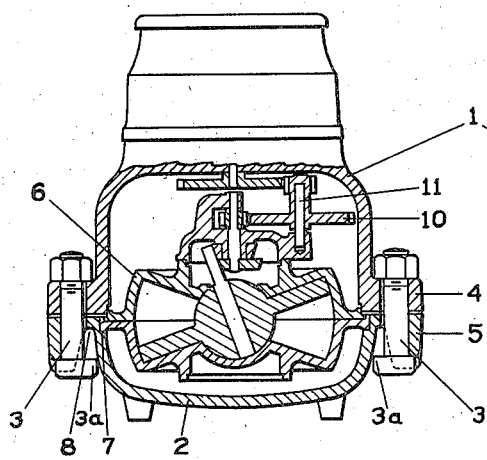
Figure 2:
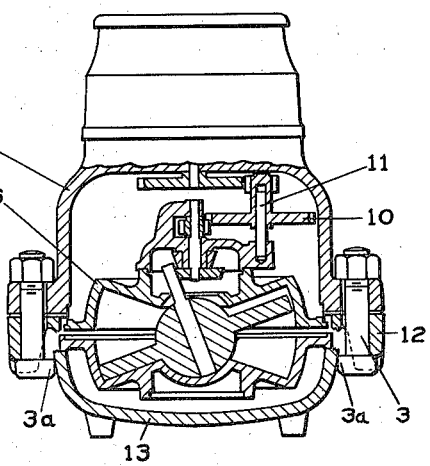
Figure 3:
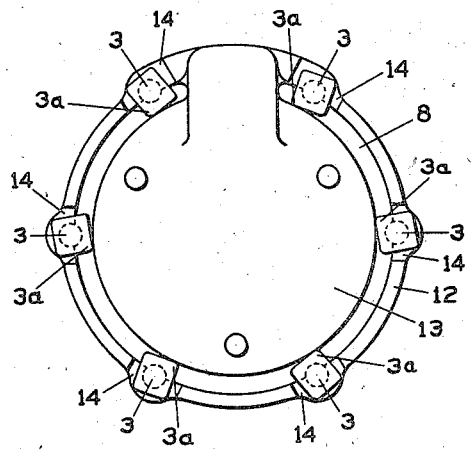

In the accompanying drawing Figure 1 is a vertical partial section of my improved meter; Figure 2 is a vertical partial section of the meter, showing how the expansion of frozen water breaks the breakable part of the meter casing by tension and not in the usual manner by shear; Figure 3 is an exterior view of the bottom of the meter and shows the shape of the bolt heads, the depressed seats for the bolt heads, and how the bolt heads engage the movable part of the breakable bottom casing.

Referring to the drawing, 1 is the main outer casing of the meter, 2 is the breakable bottom casing of the meter which is attached to casing 1 by bolts 3, 3, 3, 3, 3 and 3 having heads with projecting corners 3a, 3a, 3a, 3a, 3a and 3a. These bolts in opposite pairs pass through meeting flanges 4 and 5, clamping them together. 6 is the measuring chamber clamped and centered between casings 1 and 2 in the machined grooved seat 7 formed in the upper machined surface of flange 5 of breakable casing 2. On the under side of flange 5 is formed the cast groove 8 which extends upwards to and a little above the bottom plane of grooved seat 7, so that when the meter freezes the metal, which is of a predetermined thickness, between grooved seat 7 and recess 8 will fracture by the tension strain becoming too great for it to withstand and the measuring chamber 6 will be released as shown in Figure 2. 10 is the internal immersed tooth gearing loosely mounted on rigid post 11 on top of measuring chamber 6 so that it may be raised axially from said measuring chamber when outer casing is lifted, relative to measuring chamber 6.

Bottom casing 2 consists essentially, after fracture, of two parts. Outer part 12 is the portion that remains attached to main outer casing 1 even after the meter is frozen. 13 is the central movable part which is displaced downward by the expansion of the ice within the meter. In order to prevent part 13 from dropping entirely away from the meter, I have made bolt 3 with a head having a projecting corner which engages part 13 firmly, to prevent its falling away from the meter after fracture of bottom casing 2, but at the same time not so tightly as to prevent the downward movement of part 13 when the meter is frozen. Bolt 3 can be rotated slightly if the force of rotation applied to it is great enough to overcome the friction between the bolt and meeting flanges 4 and 5. In this way part 13 can be displaced slightly downward even though the head of bolt 3 engages it, because the force of freezing is great enough to exert a wedging action on the head of bolt 3, allowing it to move slightly as is necessary to allow a slight downward movement of part 13.

As shown in plan in Figure 3, seat 14 in part 12 is slightly depressed so as to allow the use of a bolt of moderate length, but at the same time to provide greater strength in part 12 at the points in meeting flange 5 half-way between the bolts where the strain is greatest. Seat 14 is so constructed in my meter that it does not interfere in any way with the rotation of head of bolt 3, but allows it to turn freely and engage part 13, all as shown in the drawing, gripping it to prevent part 13 falling entirely away from the meter after fracture of breakable bottom case 2 by freezing of the meter.

Having thus described my invention what I claim and wish to secure by Letters Patent is:

1. A water meter comprising a main outer casing and a breakable bottom casing provided with a securing flange having at the base thereof an internal groove coacting with the outer surface of said bottom casing to form a readily breakable portion, a meter measuring mechanism positively supported by that part of the bottom casing surrounded by said readily breakable portion but automatically released when said portion breaks, and a plurality of pairs of holding means attaching said bottom casing to said main outer casing through said securing flange outside of said readily breakable portion and also engaging said bottom casing on the outer surface of that part of the bottom casing surrounded by said readily breakable portion to restrict the movement of said part when said readily breakable portion breaks; substantially as and for the purpose described.

2. A water meter comprising a main outer casing and a breakable bottom casing provided with a securing flange having at the base thereof an internal groove and an external groove which coact to form an annular reduced portion readily breakable under a tensile stress, a meter measuring mechanism positively supported by that part of the bottom casing surrounded by said readily breakable portion but automatically released when said portion breaks, immersed toothed gearing capable of axial movement independent of both said main outer casing and said measuring mechanism when said measuring mechanism is displaced from its normal position by said meter freezing, and a plurality of pairs of holding means comprising bolts with projecting corners for attaching said bottom casing to said main outer casing through said securing flange outside of said readily breakable portion and also for engaging said bottom casing on the outer surface of that part of the bottom casing surrounded by said readily breakable portion to restrict the movement of said part when said readily breakable portion breaks; substantially as and for the purpose described.

ROBERT S. BASSETT.